US006051782A

United States Patent [19]

Wagner

[11] Patent Number: 6,051,782

[45] Date of Patent: Apr. 18, 2000

[54] CONDUCTOR LAYOUT FOR ELECTRICAL JUNCTION BOX

[75] Inventor: Brian L. Wagner, Ypsilanti, Mich.

[73] Assignee: Yazaki Corporation, Tokyo, Japan

[21] Appl. No.: 09/010,252

[22] Filed: Jan. 21, 1998

[51] Int. Cl.[7] .............................. H02G 5/00; H02G 5/08; H01B 5/00

[52] U.S. Cl. ......................... 174/52.1; 174/59; 174/71 B; 174/72 B; 174/72 A; 174/99 B

[58] Field of Search ................................ 174/71 B, 72 B, 174/99 B, 230, 72 C, 72 TR, 72 A, 52.1, 59, 61

[56] References Cited

U.S. PATENT DOCUMENTS

| | | | |
|---|---|---|---|
| 4,460,232 | 7/1984 | Sotolongo | 339/122 R |
| 4,938,719 | 7/1990 | Sawai et al. . | |
| 5,184,280 | 2/1993 | Fouad | 361/361 |
| 5,223,676 | 6/1993 | Yamamoto et al. . | |
| 5,306,181 | 4/1994 | Monie et al. . | |
| 5,434,749 | 7/1995 | Nakayama . | |
| 5,442,142 | 8/1995 | Hayashi | 174/250 |
| 5,831,425 | 11/1998 | Ochiai | 324/117 R |

*Primary Examiner*—Kristine Kincaid
*Assistant Examiner*—Mark Olds
*Attorney, Agent, or Firm*—Young & Basile, P.C.

[57] ABSTRACT

A bus bar type conductor arrangement for a vehicle-type electrical junction box, used to electrically connect components such as relays and fuses with wire harnesses from vehicle electrical systems. Three dimensional bus bar conductors are mounted on a three-dimensional array of post-type mounting points formed in the junction box, such that the conductors can cross paths and connect components and terminals of varying height in the junction box. The conductor arms are preferably coated between the conductive contact ends with an electrically insulating material, and can include intermediate conductive regions adapted to be mounted to components or other bus bars in the same fashion as the conductive ends.

14 Claims, 4 Drawing Sheets

CONDUCTOR LAYOUT FOR ELECTRICAL JUNCTION BOX

FIELD OF THE INVENTION

This invention is in the field of electrical junction boxes of the type used in vehicle electrical systems, and more specifically relates to the conductor layout within such junction boxes.

BACKGROUND OF THE INVENTION

A junction box (sometimes referred to as a battery interface center) simplifies vehicle electrical systems by organizing electrical components such as fuses, relays, electronic modules and branched circuits into a single housing. Wire harnesses connected to various vehicle electrical systems are routed into the junction box through connectors built into the junction box walls. Bus bars or circuit boards link the connectors to the various components housed in the junction box.

An example of a prior art junction box is illustrated in FIG. 1. Junction box 10 is molded from a non-conductive plastic. Conductive bus bars 32 are mounted on or formed integrally with a circuit board 2. Electrical components in the circuit board are electrically connected with various vehicle systems through bus bars 32 and terminals 3 which extend through the walls 4 of the junction box.

The circuit board and bus bars must be designed such that electrical paths defined by the bus bars and components do not cross. However, junction boxes are increasingly required to house an ever greater number of components, straining the ability of prior art bus bar and circuit board arrangements to accommodate the components in a single housing of limited size.

Attempts have been made to accommodate the increase in the number of components per junction box. U.S. Pat. No. 4,938,719 to Sawai et al discloses a junction box with multiple levels of insulated wires embedded in a block of insulating material. Contact terminals are inserted into the block to connect the various wires with the proper components. Drawbacks of this design are the complexity of the junction block and the limited layout options for the contact terminals throughout the various layers.

U.S. Pat. No. 5,223,676 to Yamamoto et al. discloses multiple layers of conductors embedded in an insulated board. A drawback of this arrangement is that the substrate must be manufactured with the conductors embedded within. As the number of components increases, the substrate becomes thicker and more difficult to make, and places a significant limit on the number of components that can be added to the junction box.

U.S. Pat. No. 5,306,181 to Monie et al. discloses a planar fuse panel where the conductive metal is selectively coated with an insulating layer to allow closer packaging of components without the electrical current crossing paths.

U.S. Pat. No. 5,434,749 to Nakayoma discloses a circuit board having a flexible printed circuit sheet through which the conductors pass. The ends of the conductors are bent up (terminal portions) or down (connection tabs) to pass through a circuit board and an insulation substrate to engage a bus bar connection pattern in the printed circuit board. This patent also discloses alternating stacked layers of circuit boards and insulation substrates to separate the overlapping bus bars.

SUMMARY OF THE INVENTION

The present invention solves the problems of component and conductor layout in a junction box of limited size by providing a three-dimensional conductor layout in which independent three-dimensional bus bar conductors are secured in the junction box on a three-dimensional array of independent mounting points. In a preferred form, the three-dimensional array of mounting points is a series of posts of varying height whose ends provide mounting points for select portions of the bus bar conductors.

In a further preferred form, the bus bar conductors have conductive ends and intermediate portions covered by an insulating material. In a further preferred form, the insulating material is removed or omitted at points along the bus bar to provide conductive mounting points which may be secured directly to one of the above-mentioned posts and/or the conductive portion of another bus bar.

With the present invention, the electrical component layout in the junction box can first be established for ease of serviceability and packaging efficiency, and the conductor layout then designed to be routed around them in the available remaining space. The three-dimensional conductors can cross over and under one another and can be routed around the components while maintaining a neat, serviceable layout.

These and other advantages of the invention will become apparent from a further reading of the drawings and written specification.

DETAILED DESCRIPTION OF THE PREFERRED EMBODIMENT

Figure 2:
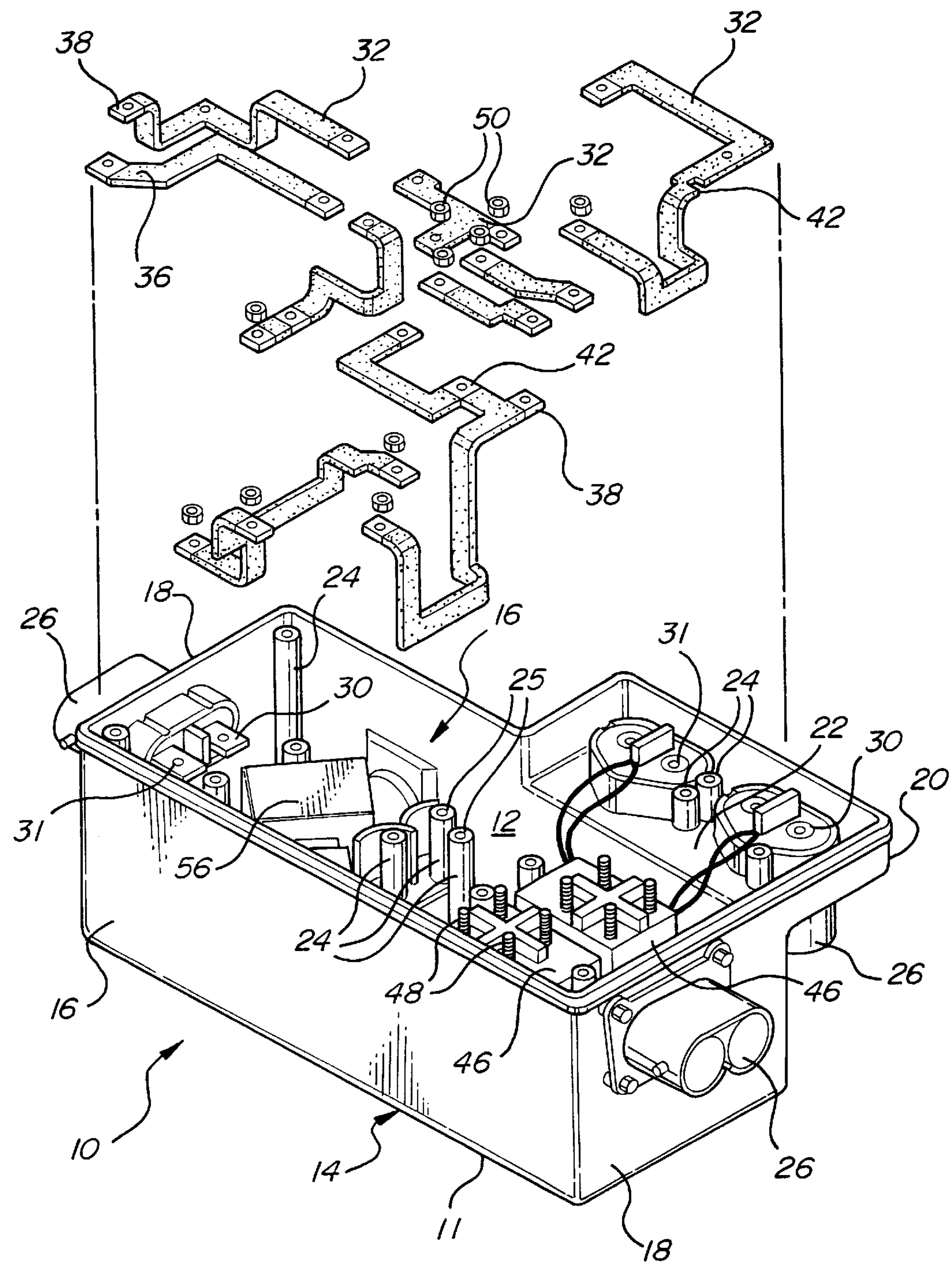
FIG. 2 is a partially exploded perspective view illustrating an electrical junction box and conductors according to the present invention.

FIG. 2 illustrates an electrical junction box 10 according to the present invention. The illustrated junction box, molded from a non-conductive plastic, has a housing 11 with an interior 12, a lower surface 14, side walls 16, and end walls 18 and also includes a shelf section 20 projecting from one of the side walls 16. The shelf section 20 forms part of the interior 12 of junction box 10, and includes a component-supporting shelf 22 on a different level than the lower surface 14 of the junction box. It should be understood that the specific shape and size of the junction box housing are immaterial, as the present invention can be incorporated into almost any junction box.

The illustrated junction box 10 shows standard electrical connectors 26 extending through end walls 18 and through shelf 22. Connectors 26 receive conductive metal electrical terminal ends 30 of wire harnesses routed to the junction box from various vehicle electrical systems. The terminals 30 are of conventional type with threaded apertures 31 on the ends located in interior 12 of junction box 10.

A primary function of the junction box is to efficiently house a number of electrical components and connect them at a centralized location to the various wire harnesses from the electrical systems routed to the box. Still referring to FIG. 2, a number of standard electrical components such as relays 46 and electronic modules 56 are illustrated in the junction box in one of many possible arrangements.

A number of support posts 24 are molded integrally with housing 11, located among and between the components with upper ends 25 of varying height to define a point-by-point, three-dimensional bus bar mounting array throughout the interior of the junction box. Illustrated posts 24 have internal threads or internally threaded metal inserts in their flat upper ends 25 for threaded mechanical fasteners (see FIG. 3). The three-dimensional array of mounting points established by posts 24 is designed to receive and mount one or more three-dimensional bus bar conductors 32 formed, for example, by an operation such as stamping from conductive metal. At least some of conductors 32 are curved or bent to be three-dimensional, as needed for a given component layout, with arms extending in different directions and at different levels or planes.

Once a preferred component layout is established for a particular junction box, a set of multi-dimensional bus bar conductors 32 can be designed to efficiently connect those components to their respective wire harness terminals 30 and/or each other, as needed. It will be apparent to those skilled in the art that the exact shape and number of bus bars 32 in a given junction box will depend on the number, type and layout of components and wire harness terminals in the box.

Bus bar conductors 32 are selectively covered with a thin coat of high dielectric strength insulating material 36, for example an electrostatic powder, to insulate them from each other and from the electrical components in the junction box. The ends 38 of each bus bar are left uncovered by the insulating material to provide exposed, conductive metal ends. These conductive ends 38 are provided with mounting provisions, preferably holes for the threaded fasteners mentioned above, so that they may be mechanically fastened to wire a harness terminals 30, the components, and/or mounting posts 24. It is preferred that conductive ends 38 be horizontal so that they can be mounted axially in drop-in fashion on the horizontal upper faces of posts 24.

In a preferred form, intermediate regions of bus bars 32 are provided with mounting holes 42 which may or may not include surrounding regions of exposed metal to provide intermediate electrical contact points for connection to components and/or other bus bars. Again, the specific arrangement of mounting holes and exposed contact areas on each bus bar will vary depending on the particular application, as will be understood by those skilled in the art.

Figure 3:
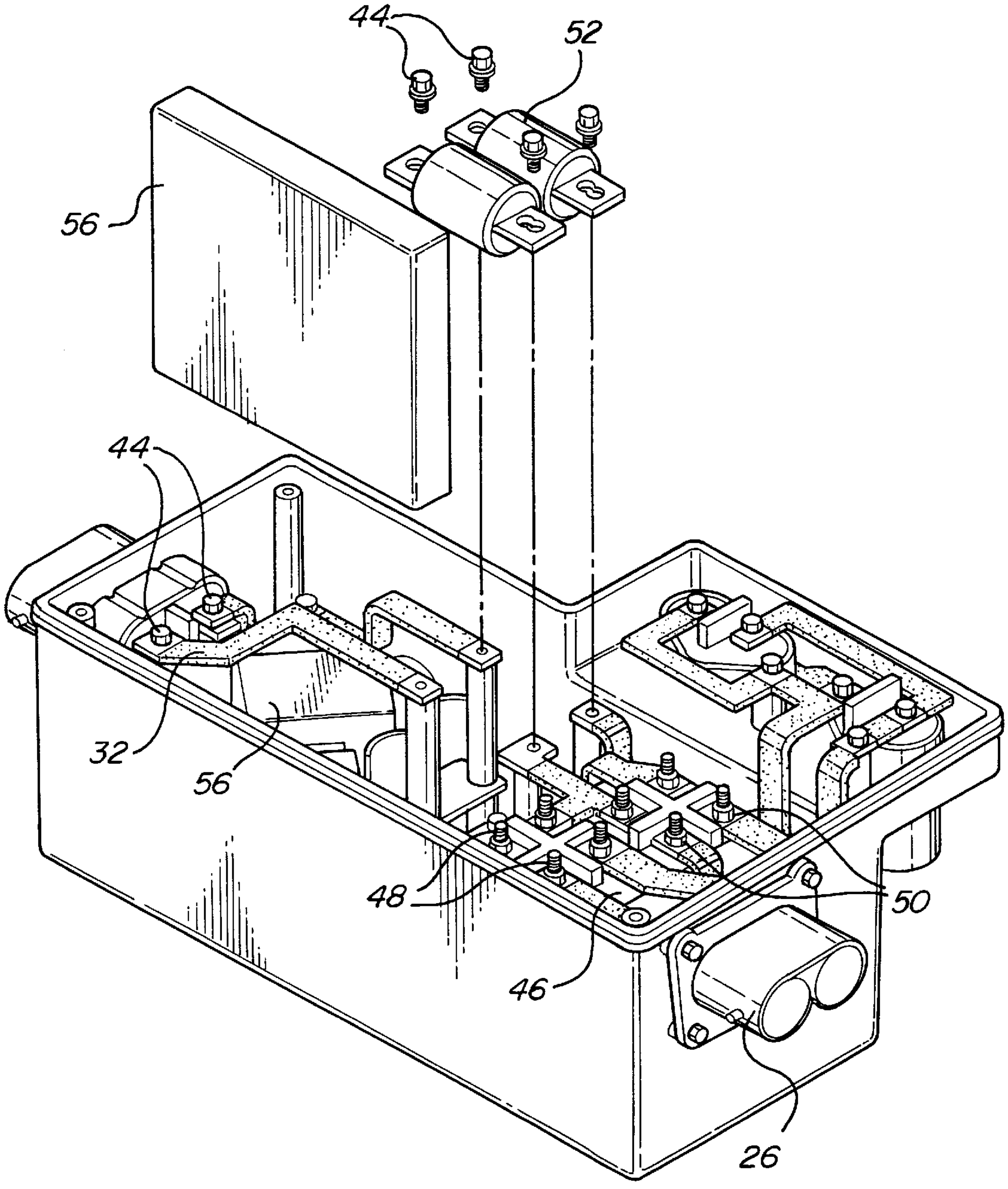
FIG. 3 is a partially exploded perspective view of the electrical junction box of FIG. 2, illustrating the placement of separate components.

As best illustrated in FIG. 3, at least some of the conductors 32 are attached at one end to wire harness terminals 30 with fasteners such as machine screws 44. The other ends of those wire harness terminal-connected conductors are either attached to a mounting post or to an electrical component, or in some cases to both as shown for example with fuses 52. Some components such as relays 46 may be provided with their own threaded terminals 48, to which the conductive ends of bus bars 32 can be connected with a simple nut 50. It will be apparent to those skilled in the art that the three-dimensional bus bar conductors and the three-dimensional mounting point array allow for great flexibility in locating components and connecting those components to appropriate wire harness terminals and/or one another.

Because conductors 32 are insulated, there is a barrier preventing current leakage between conductors throughout the junction box. The excess weight and bulk of an insulation substrate or similar barrier is eliminated.

Another advantage of the present invention is the increased electrical contact surface area provided by the flat faces of the exposed metal portions of conductors 32, and the conductive inside surface of the mounting holes through these exposed regions.

Figure 1:
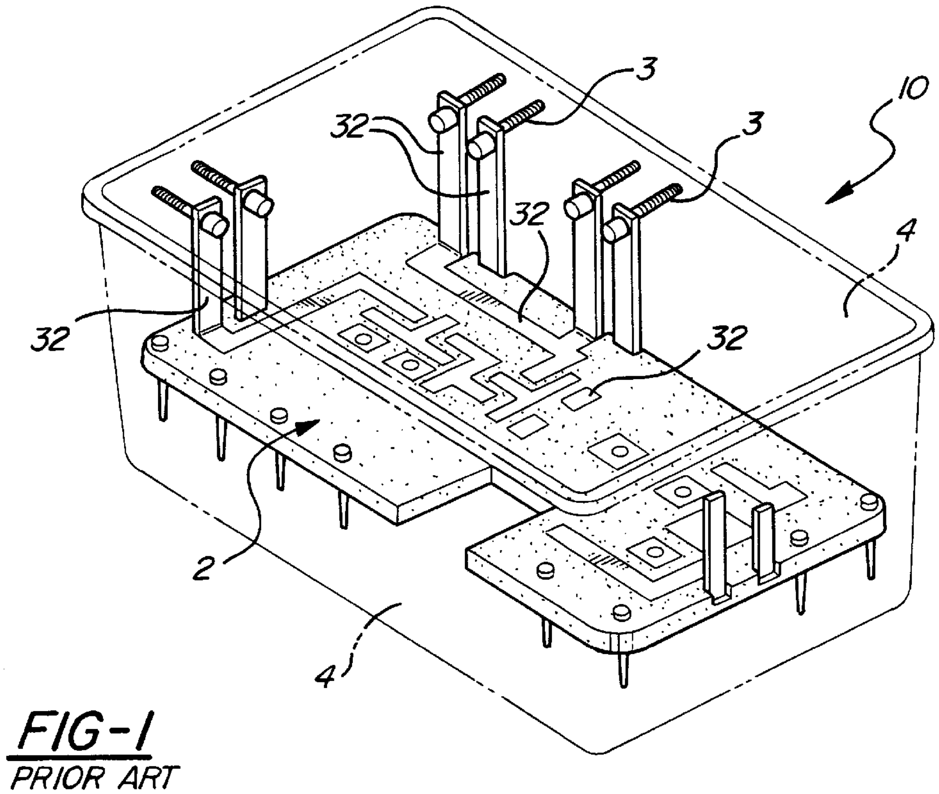
FIG-1 PRIOR ART
FIG. 1 is a perspective view showing a prior art electrical junction box and conductor layout.
Figure 4:
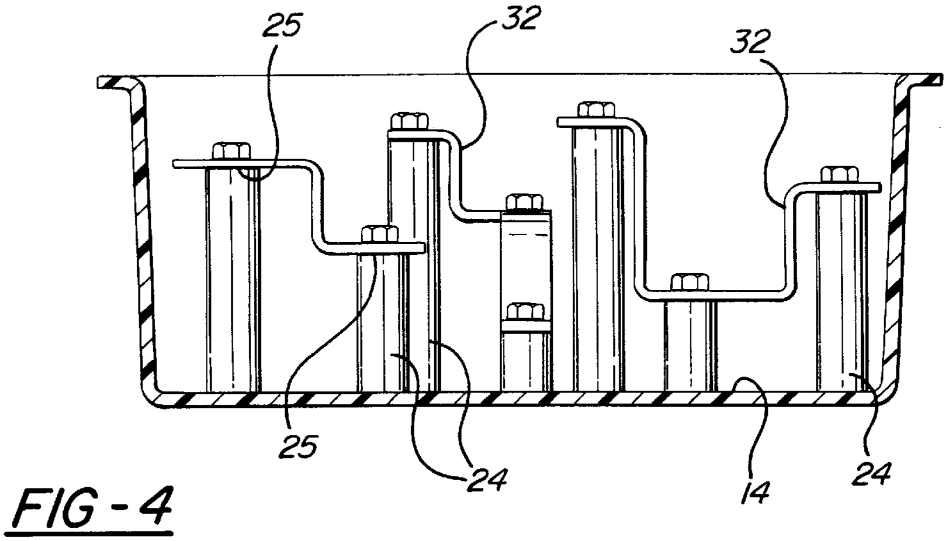
FIG. 4 is a simplified side section view of an electrical junction box according to the present invention, illustrating the three-dimensional, point by point mounting of the conductors; and, FIG. 5 is a perspective view of the simplified junction box of FIG. 4.
Figure 5:
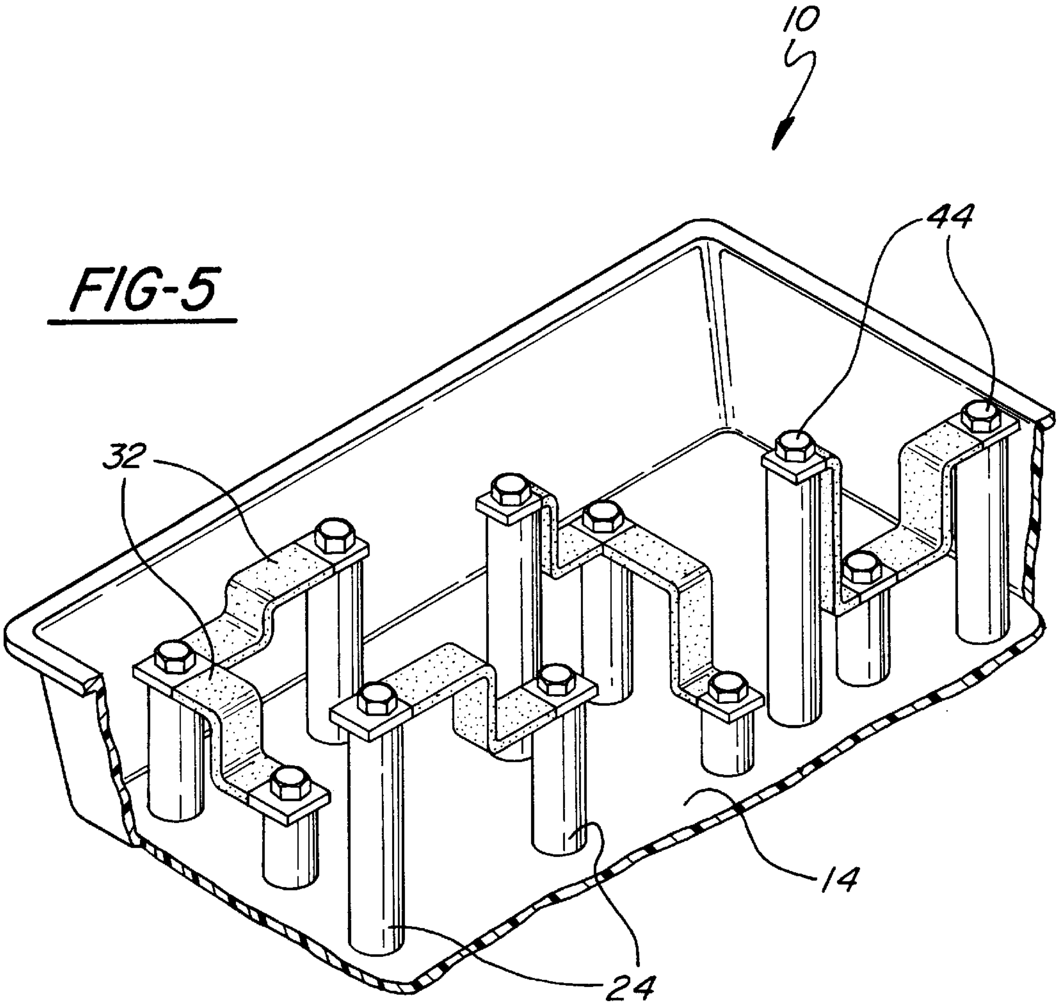

Referring now to FIGS. 4 and 5, a simplified junction box is illustrated in cutaway side and perspective views, with the electrical components removed to clearly illustrate the three-dimensional nature of the bus bar routing and mounting arrangement according to the present invention. Upper ends 25 of posts 24 define a point-by-point mounting array to which the pre-formed, individual, multi-dimensional bus bar conductors 32 can be mounted in simple axial drop-in fashion with mechanical fasteners 44.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements. Accordingly, I claim:

I claim:

1. A bus bar conductor layout for a vehicle electrical system junction box having a housing, one or more wire harness terminals, and electrical components, comprising:

at least one three-dimensional bus bar conductor having integral conductor arms in at least three planes of which at least two planes are horizontal, the bus bar conductor terminating in conductive ends adapted to be removably connected to one or more of the wire harness terminals and electrical components;

a multi-level array of mounting points in the housing adapted to support multi-level portions of the bus bar conductor, wherein the multi-level array of mounting points comprises multiple support posts of different height within the junction box, the support posts being located between the components in the junction box and having upper ends adapted to support horizontal portions of the bus bar conductor between the components.

2. The apparatus of claim 1, wherein the multi-level array of mounting points further comprises portions of the wire harness terminals and the electrical components, and wherein each of the horizontal plane bus bar conductor arms is supported on one of the wire harness terminals, electrical components, and support posts in the three planes.

3. The apparatus of claim 1, wherein the support posts are molded integrally with the junction box.

4. The apparatus of claim 1, wherein the upper ends of the support posts are provided with threaded mounting holes for receiving threaded connectors.

5. The apparatus of claim 4, wherein the horizontal portions of the bus bar conductor include apertures through which a threaded connector can be inserted.

6. The apparatus of claim 1, wherein the upper ends of the support posts include horizontal upper faces adapted to receive the horizontal portions of the conductor arms in a secured manner.

7. The apparatus of claim 6, wherein the bus bar conductor is covered over a major portion of its length with an insulating material, and further includes at least two horizontal conductive portions capable of resting on and being secured to the upper ends of the support posts.

8. The apparatus of claim 1, wherein the bus bar conductor comprises two exposed conductive metal ends and an intermediate length covered with an electrically insulating material.

9. The apparatus of claim 8, wherein a horizontal portion of the intermediate length of the conductor is provided with a mounting hole.

10. The apparatus of claim 9, wherein the mounting hole on the intermediate length of the conductor is located in a portion of the intermediate length from which electrically insulating material has been omitted or removed to provide a conductive mounting portion.

11. A bus bar conductor layout for a vehicle electrical system junction box having a housing, one or more wire harness terminals in the housing, and electrical components in the housing, comprising a plurality of bus bar conductors having integral conductor arms in at least three planes, the bus bar conductors terminating in conductive ends and having an additional conductive mounting portion, the conductive ends and the conductive mounting portion adapted to be removably connected to one or more of the wire harness terminals and electrical components, and further including support posts of varying height within the junction box, the support posts being located between the components in the junction box and having upper ends adapted to receive the conductive ends or mounting portion of the bus bar conductors, wherein each of the bus bar conductors in the junction box is independently secured at its conductive ends and mounting portion to one of the electrical components, the wire harness terminals and the support posts.

12. A bus bar conductor layout for a vehicle electrical system junction box having a housing, one or more wire harness terminals, and electrical components, comprising:

at least one multi-level, multi-directional bus bar conductor having integral conductor arms extending in at least three planes, the bus bar conductor terminating in at least two planar conductive ends whose planes are horizontal, the conductive ends being adapted to be electrically connected to one or more of the wire harness terminals and electrical components;

a multi-level array of mounting points in the housing adapted to support multi-level horizontal portions of the conductor.

13. The apparatus of claim 12, wherein the multi-level array of mounting points is selected from the group consisting of the wire harness terminals, the electrical components, and a plurality of support posts of different height within the junction box, the support posts being located between the electrical components in the junction box and having upper ends adapted to receive the at least two planar horizontal conductive ends of the bus bar conductor.

14. The apparatus of claim 13, wherein a first one of the horizontal conductive ends is electrically connected to a wire harness terminal, a second one of the horizontal conductive ends is connected to an electrical component, and an intermediate portion of the bus bar conductor in a horizontal plane different than the plane of the first and second horizontal conductive ends is connected to one of the support posts.

* * * * *